Patented Mar. 8, 1938

2,110,834

UNITED STATES PATENT OFFICE

2,110,834

ACCELERATION OF VULCANIZATION OF RUBBER

Ludwig Orthner, Leverkusen-on-the-Rhine, and Ewald Zaucker, Cologne-Mulheim-on-the-Rhine, Germany, assignors to I. G. Farbenindustrie Aktiengesellschaft, Frankfort-on-the-Main, Germany No Drawing. Original application June 23, 1931, Serial No. 546,417. Divided and this application July 1, 1932, Serial No. 620,527. In Germany June 28, 1930

1 Claim.  (Cl. 18—53)

The present invention relates to a process of vulcanizing rubber and to the vulcanizates obtainable by said process.

Mercapto arylene thiazoles have already been suggested for accelerating vulcanization. This class of substances, however, possesses the disadvantage of an unfavorable critical temperature, that is to say, the use thereof involves the danger of a premature commencement of the vulcanization.

In accordance with the present invention natural rubber or artificial rubber-like masses obtainable, for example, by polymerizing butadiene or another homologue or an analogue of butadiene, are vulcanized with the addition of vulcanization accelerators possessing considerably more favorable critical temperatures, said new vulcanization accelerators having the probable general formula:—

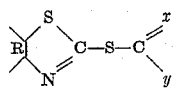

wherein R stands for a benzene or naphthalene nucleus, which may be substituted by monovalent substituents, for example, by alkyl, alkoxy, halogen or a nitro group, $x$ stands for a sulfur or oxygen atom, and $y$ stands for aryl, such as phenyl or substituted phenyl, or an alkoxy group.

These new accelerators are obtainable by causing an about molecular quantity of a compound of the probable general formula:—

wherein Hal stands for a halogen atom, $x$ stands for an oxygen or sulfur atom, and $y$ stands for a halogen atom, aryl or alkoxy to react with at least an about molecular quantity of a $\mu$-mercapto arylenethiazole, as is more fully described in the annexed examples.

As suitable compounds of the general formula

coming into consideration for the purpose of the invention, there may be mentioned by way of example:— phosgene, chloroformic acid methylester:
   Cl—CO—OCH₃;
chloroformic acid ethylester:
   Cl.CO.OC₂H₅;
chloroformic acid propylester:

Cl.CO.OC₃H₇;
chloroformic acid isopropylester:
   Cl.CO.OCH(CH₃)₂;
chloroformic acid butylester:
   Cl.CO.OC₄H₉;
chloroformic acid amylester:
   Cl.CO.OC₅H₁₁;
chloroformic acid benzylester:
   Cl.CO.OCH₂.C₆H₅;
chloroformic acid beta-chloroethylester:
   Cl.CO.OCH₂.CH₂Cl;
chloroformic acid cyclohexylester:
   Cl.CO.C₆H₁₁;
benzoylchloride:
   Cl—Co.C₆H₅;
para-nitrobenzoylchloride:
   Cl.CO.C₆H₄NO₂;
para-chlorobenzoylchloride:
   Cl—CO.C₆H₄Cl;
2.4-dichlorobenzoylchloride:
   Cl.CO.C₆H₃Cl₂;
para-methoxybenzoylchloride:
   Cl.CO.C₆H₄(OCH₃);
2-chloro-5-nitrobenzoylchloride:

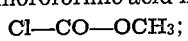

nitro-para-toluylic acid chloride:

para-tolyl-2-benzoylchloride:
   Cl.CO.C₆H₄.C₆H₄.CH₃;
chlorobenzoyl-2-benzoylchloride:
   Cl.CO.C₆H₄.CO.C₆H₄.Cl;

The new accelerators are generally colorless to yellowish crystalline substances, insoluble in water, soluble in the usual organic solvents, and are particularly valuable in view of their favorable critical temperatures.

For vulcanization purposes the new vulcanization accelerators are incorporated within the rubber (which term is intended to include natural rubber as well as artificial rubber-like masses, derived, for example, from butadiene, isoprene, dimethylbutadiene or another homologue or analogue of butadiene) in any desired manner, for example, by rolling or kneading. Obviously, a vulcanizing agent, such as sulfur, agents being able to split off sulfur, selenium etc. is likewise added, and if desired, other ingredients known to favorable influence rubber-vulcanization processes or the properties of the vulcanizates obtainable may be admixed to the vulcanization mixture. The latter is then vulcanized in the usual manner by heating it to a temperature sufficient to perform vulcanization, for example, to a temperature between about 100–170° C.

Representatives of this new class of accelerators, which possess too low a velocity on hot vulcanization, can be adjusted to give more favorable times of heating by combination with stearic acid and/or with appropriate accelerators of classes other than that of the present invention especially basic accelerators while preserving a satisfactory critical temperature.

The following examples will illustrate the invention without, however, restricting it thereto:—

Example 1

To a solution of 100 grams of $\mu$-mercapto benzothiazole and 24 grams of sodium hydroxide in 200 ccs. of methyl alcohol, 65 grams of chloroformic acid ethylester (I) or 56,5 grams of chloroformic acid methylester (II) are dropped, the reaction mixture is boiled for 5 minutes and poured on to ice. After recrystallization from petrolether the condensation product obtained with the ethylester (I) has the melting point of 66° C., the condensation product obtained with the methylester (II) has the melting point of 56° C. The reaction proceeds according to the following equation:

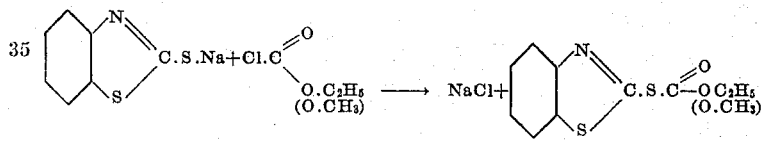

Example 2

Into a solution of 100 grams of $\mu$-mercapto benzothiazole and 24 grams of sodium hydroxide in 200 ccs. of acetone, 84 grams of benzoylchloride are dropped in slowly. On diluting the reaction mixture with water the reaction product of the formula

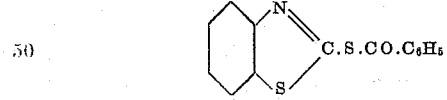

and having a melting point of 130° C. is precipitated.

When substituting the 84 grams of benzoylchloride by 111 grams of para-nitrobenzoylchloride, the compound of the formula

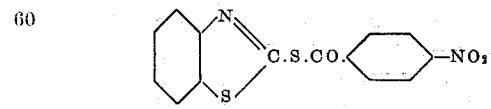

separates directly in the reaction; after washing with water it shows the melting point of 276° C.

Example 3

The condensation product from $\mu$-mercapto benzothiazole (sodium salt) and chloroformic acid methylester (I in the table) was tested as accelerator in the following mixture:—

| | Parts by weight |
|---|---|
| Crepe | 100 |
| Zinc oxide | 5 |
| Sulfur | 3 |
| Stearic acid | 1.5 |
| Accelerator | 1.08 | the condensation product from $\mu$-mercapto benzothiazole (sodium salt) and chloroformic acid ethylester (II in the table) was tested in the following mixture:—

| | Parts by weight |
|---|---|
| Crepe | 100 |
| Zinc oxide | 5 |
| Sulfur | 3 |
| Stearic acid | 1.8 |
| Accelerator | 1.15 | the condensation product from $\mu$-mercapto benzothiazole (sodium salt) and phosgene (III in the table) was tested in the following mixture:—

| | Parts by weight |
|---|---|
| Crepe | 100 |
| Zinc oxide | 5 |
| Sulfur | 3 |
| Stearic acid | 1.5 |
| Accelerator | 0.8 | the condensation products from $\mu$-mercapto benzothiazole (sodium salt) and benzoylchloride (IV in the table) and para-nitrobenzoylchloride (V in the table) were tested in the following mixture:—

| | Parts by weight |
|---|---|
| Crepe | 100 |
| Zinc oxide | 5 |
| Sulfur | 3 |
| Stearic acid | 1.5 |
| Accelerator | 1.0 |

The following values were obtained
A=tensile strength in kg. per sq. cm.
B=stretch in percent.

| Heating | | I | | II | | III | | IV | | V | |
|---|---|---|---|---|---|---|---|---|---|---|---|
| Minutes | Press. ab. atm. | A | B | A | B | A | B | A | B | A | B |
| 30 | 0.5 | | 438 | | 511 | | | | | | |
| 20 | 2.0 | 105 | 1015 | 93 | 1060 | | | Not tested | | | |
| 60 | 2.0 | 150 | 933 | 180 | 918 | | | Not tested | | | |
| 15 | 3.0 | | | | | 102 | 887 | 115 | 994 | 50 | 1118 |
| 35 | 3.0 | | | | | 133 | 852 | 145 | 841 | 139 | 868 |

With the mixture:—

| | Parts by weight |
|---|---|
| Crepe | 100 |
| Zinc oxide | .5 |
| Sulfur | 3 |
| Stearic acid | 1 |
| Diphenylguanidine | 0.2 |
| Accelerator | 0.8 | the following values were obtained:—

| Heating | | II | | IV | |
|---|---|---|---|---|---|
| Minutes | Press. ab. atm. | A | B | A | B |
| 30 | 0.5 | 19 | 1130 | ----- | ----- |
| 10 | 3.0 | 159 | 940 | 141 | 940 |
| 20 | 3.0 | 102 | 842 | 168 | 870 |
| 60 | 3.0 | 153 | 856 | 159 | 864 |

This is a division of our co-pending application Serial No. 546,417, filed June 23, 1931.

We claim:—

The process of treating rubber which comprises vulcanizing a rubber mix to which has been added diphenylguanidine and a product obtainable by reacting a 2-mercaptobenzothiazole with ethyl chloroformate.

LUDWIG ORTHNER.
EWALD ZAUCKER.